US012790142B2

(12) United States Patent

Khamis et al.

(10) Patent No.: US 12,790,142 B2
(45) Date of Patent: Nov. 10, 2026

(54) MULTIMODAL FREIGHT MONITORING AND CONTEXTUAL NOTIFICATION FOR DELIVERY VEHICLE

(71) Applicant: GM GLOBAL TECHNOLOGY OPERATIONS LLC, Detroit, MI (US)

(72) Inventors: Alaa M. Khamis, Courtice (CA); Yun Qian Miao, Waterloo (CA); Christopher L. Oesterling, Troy, MI (US); Derek B. Ancrum, Pickering (CA); Shawn F. Granda, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 981 days.

(21) Appl. No.: 17/973,763

(22) Filed: Oct. 26, 2022

(65) Prior Publication Data

US 2024/0140738 A1 May 2, 2024

(51) Int. Cl.
*B65G 67/04* (2006.01)
*G06V 20/52* (2022.01)

(52) U.S. Cl.
CPC ............. *B65G 67/04* (2013.01); *G06V 20/52* (2022.01)

(58) Field of Classification Search
CPC ...... G06V 10/143; G06V 20/52; G06V 20/56; G06V 20/597; B65G 67/04
See application file for complete search history.

(56) References Cited

U.S. PATENT DOCUMENTS

| | | | | |
|---|---|---|---|---|
| 2016/0050356 | A1* | 2/2016 | Nalepka | H04N 7/181 348/148 |
| 2017/0101278 | A1* | 4/2017 | Stone | B65G 69/00 |
| 2017/0351268 | A1* | 12/2017 | Anderson | G07C 5/0825 |
| 2017/0372484 | A1* | 12/2017 | Carlson | G06F 18/40 |
| 2019/0102874 | A1* | 4/2019 | Goja | G06N 5/022 |
| 2019/0114577 | A1* | 4/2019 | Kilburn | G06F 9/542 |
| 2019/0361094 | A1* | 11/2019 | Harris | G01S 17/89 |
| 2020/0104785 | A1* | 4/2020 | Ehrman | G01S 17/88 |
| 2020/0135029 | A1* | 4/2020 | Raichelgauz | B60W 60/0025 |
| 2020/0184233 | A1* | 6/2020 | Berberian | G06V 20/588 |
| 2021/0082220 | A1* | 3/2021 | Boerger | B65G 67/04 |
| 2022/0155130 | A1* | 5/2022 | Laine | G01G 19/021 |
| 2022/0227356 | A1* | 7/2022 | Gould | H04W 4/029 |
| 2025/0115178 | A1* | 4/2025 | Lacaze | B60P 7/06 |

* cited by examiner

*Primary Examiner* — Kenny A Cese
(74) *Attorney, Agent, or Firm* — Quinn IP Law

(57) ABSTRACT

A multimodal freight monitoring and contextual notification system for a delivery vehicle. The system may include one or more monitoring systems configured to generate monitoring data for multimodal monitoring of freight included within a cargo bay of the delivery vehicle and a contextual notification controller configured to generate a contextual notification as a function thereof.

20 Claims, 6 Drawing Sheets

MULTIMODAL FREIGHT MONITORING AND CONTEXTUAL NOTIFICATION FOR DELIVERY VEHICLE

INTRODUCTION

The present disclosure relates to multimodal freight monitoring and contextual notification methods and systems for a delivery vehicle, such as but not necessarily limited to methods and systems configured to generate contextual notifications when freight has been improperly packed, improperly packaged, and/or shifted, leaned, and/or fallen.

A delivery vehicle may be tasked with delivering packages, boxes, cargo, equipment, and the like, which may be generically and collectively referred to herein for non-limiting purposes as freight, within a cargo bay or other transport area. Proper stacking and/or packaging of the freight may be desired to mitigate a possibility of the freight being damaged in transport by shifting, leaning and/or falling while in route to a destination. It may be difficult for an operator of the delivery vehicle to understand whether the freight has been properly stacked and/or packaged, as the operator may not be responsible for loading the freight into the delivery vehicle, e.g., the operator may be responsible for driving the delivery vehicle after the freight has been loaded, and/or may lack an ability to access the cargo area to inspect the freight, e.g., the operator may be responsible for driving a tractor unit attached to a sealed or a locked semi-trailer. Even when the operator may be capable of inspecting the freight prior to departure, the operator may be unable to inspect the freight thereafter without opening a cargo door, which may be problematic if the freight has shifted, leaned, and/or fallen during transport.

SUMMARY

One non-limiting aspect of the present disclosure relates to multimodal freight monitoring and contextual notification methods and systems for a delivery vehicle, such as but not necessarily limited to methods and systems configured to generate contextual notifications when freight has been improperly packed, improperly packaged, and/or shifted, leaned, and/or fallen.

One non-limiting aspect of the present disclosure relates to a multimodal freight monitoring and contextual notification system for a delivery vehicle. The system may include one or more monitoring systems configured to generate monitoring data for multimodal monitoring of freight included within a cargo bay of the delivery vehicle, a stacking evaluation system configured to generate a stacking evaluation for the freight as a function of the monitoring data, optionally the stacking evaluation determining one of a proper stacking and an improper stacking depending on whether the freight has been properly stacked, a packaging evaluation system configured to generate a packaging evaluation for the freight as a function of the monitoring data, optionally with the packaging evaluation determining one of a proper packaging and an improper packaging depending on whether the freight has been properly packaged, a movement evaluation system configured to generate a movement evaluation for the freight as a function of the monitoring data, optionally with the movement evaluation determining one of an unmoved status and a moved status depending on whether the freight has shifted, leaned, and/or fallen, and a contextual notification controller configured to generate a contextual notification as a function of the stacking, packaging, and movement evaluations, optionally with the contextual notification including a cargo warning for an operator of the vehicle in response to the stacking, packaging, and movement evaluations determining at least one of the improper stacking, the improper packaging, and the moved status.

The cargo warning may instruct the operator to restack the freight in response to the improper stacking being determined, to repackage the freight in response to the improper packaging being determined, to move the freight back to a loaded position in response to the moved status being determined, optionally with the loaded position corresponding with positioning of the freight prior to the shifting, leaning, or falling, to be careful when opening a cargo door of the delivery vehicle in response to the moved status being determined, to drive more carefully in response to the moved status being determined, to an alternative route in response to the moved status being determined, optionally with the alternative route guiding the operator to a destination with alternative directions differing from original directions specified in an original route to the destination.

The stacking evaluation system may be configured to generate the stacking evaluation as function of camera images included as at least part of the monitoring data, optionally with the camera images being generated with an image camera included as at least part of the monitor systems, optionally with the image camera being disposed within the cargo bay in line-of-sight of the freight.

The packaging evaluation system may be configured to generate the packaging evaluation as function of heatmaps included as at least part of the monitoring data, optionally with the heatmaps being generated with a heatmap camera included as at least part of the monitor systems, optionally with the heatmap camera being disposed within the cargo bay in line-of-sight of the freight.

The movement evaluation system may be configured to generate the movement evaluation as function of camera images included as at least part of the monitoring data, optionally with the camera images being generated with an image camera included as at least part of the monitor systems, optionally with the image camera being disposed within the cargo bay in line-of-sight of the freight.

The movement evaluation system may be configured to generate the movement evaluation as function of road conditions included as at least part of the monitoring data, optionally with the road conditions being generated with a road condition system included as at least part of the monitor systems.

The movement evaluation system may be configured to generate the movement evaluation as function of radio frequency (RF) measurements included as at least part of the monitoring data, optionally with the RF measurements being generated with an RF locating system included as at least part of the monitor systems.

The movement evaluation system may be configured to generate the movement evaluation as function of a driving score included as at least part of the monitoring data, optionally with the driving score being generated with a driver behavior system included as at least part of the monitor systems.

The system may include a human-machine-interface (HMI) configured for interfacing the cargo warning with the operator. The HMI may be an indicator included on an exterior of the delivery vehicle proximate a cargo door to the cargo bay. The HMI may be configured to prevent opening of the cargo door until the operator inputs an acknowledgment of the cargo warning to the HMI.

One non-limiting aspect of the present disclosure relates to multimodal freight monitoring and contextual notification system for a delivery vehicle. The system may include one or more monitoring systems configured to generate monitoring data for multimodal monitoring of freight included within a cargo bay of the delivery vehicle, and a contextual notification controller configured to generate a contextual notification as a function of the monitoring data, optionally with the contextual notification warning an operator of the delivery vehicle of at least one of an improper stacking, an improper packaging, and a moved status for the freight. The contextual notification controller may be configured in response to the improper stacking and/or the improper packaging to prevent a departure of the delivery vehicle. The notification controller may be configured in response to the moved status to prevent opening of an exterior cargo door after the departure until the operator inputs an acknowledgement of the contextual notification to a human-machine-interface (HMI) of the delivery vehicle.

One non-limiting aspect of the present disclosure relates to a multimodal freight monitoring and contextual notification system for a delivery vehicle. The system may include one or more monitoring systems configured to generate monitoring data for multimodal monitoring of freight included within a cargo bay of the delivery vehicle, a movement evaluation system configured to generate a movement evaluation for the freight as a function of the monitoring data, optionally with the movement evaluation determining one of an unmoved status and a moved status depending on whether the freight has shifted, leaned, and/or fallen, and a contextual notification controller configured to generate a contextual notification for indicating the unmoved status and the moved, optionally with the contextual notification being operable for communication with an operator of the delivery vehicle through a human-machine-interface (HMI) included on an exterior of the delivery vehicle proximate a cargo door to the cargo bay, optionally with the HMI providing an unmoved notification in the response to the unmoved status and a moved notification in response to the moved status.

The above features and advantages along with other features and advantages of the present teachings are readily apparent from the following detailed description of the modes for carrying out the present teachings when taken in connection with the accompanying drawings. It should be understood that even though the following Figures and embodiments may be separately described, single features thereof may be combined to additional embodiments.

BRIEF DESCRIPTION OF THE DRAWINGS

The accompanying drawings, which are incorporated into and constitute a part of this specification, illustrate implementations of the disclosure and together with the description, serve to explain the principles of the disclosure.

DETAILED DESCRIPTION

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
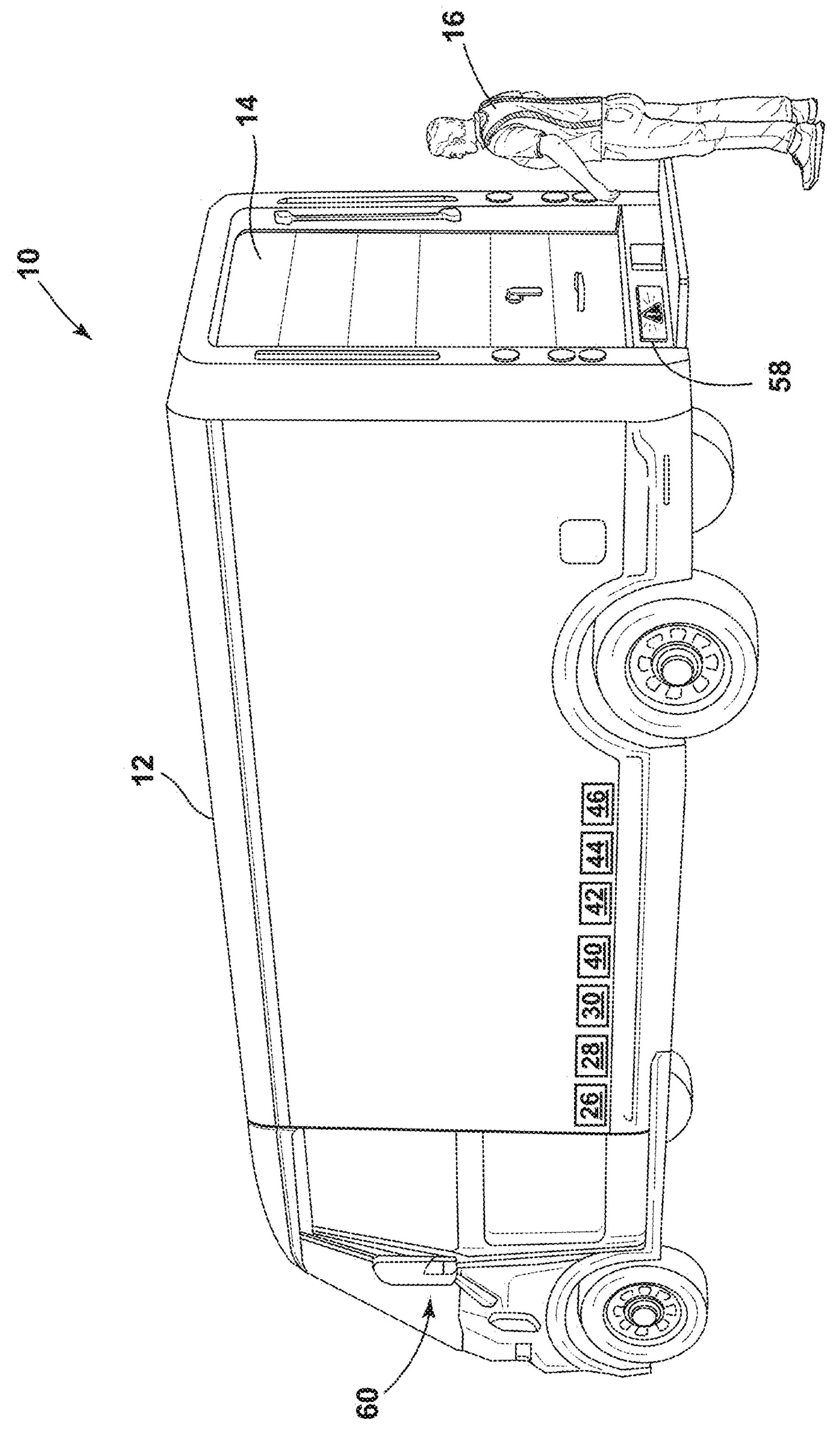
FIG. 1 illustrates a schematic view of a multimodal freight monitoring and contextual notification system in accordance with one non-limiting aspect of the present disclosure.
Figure 2:
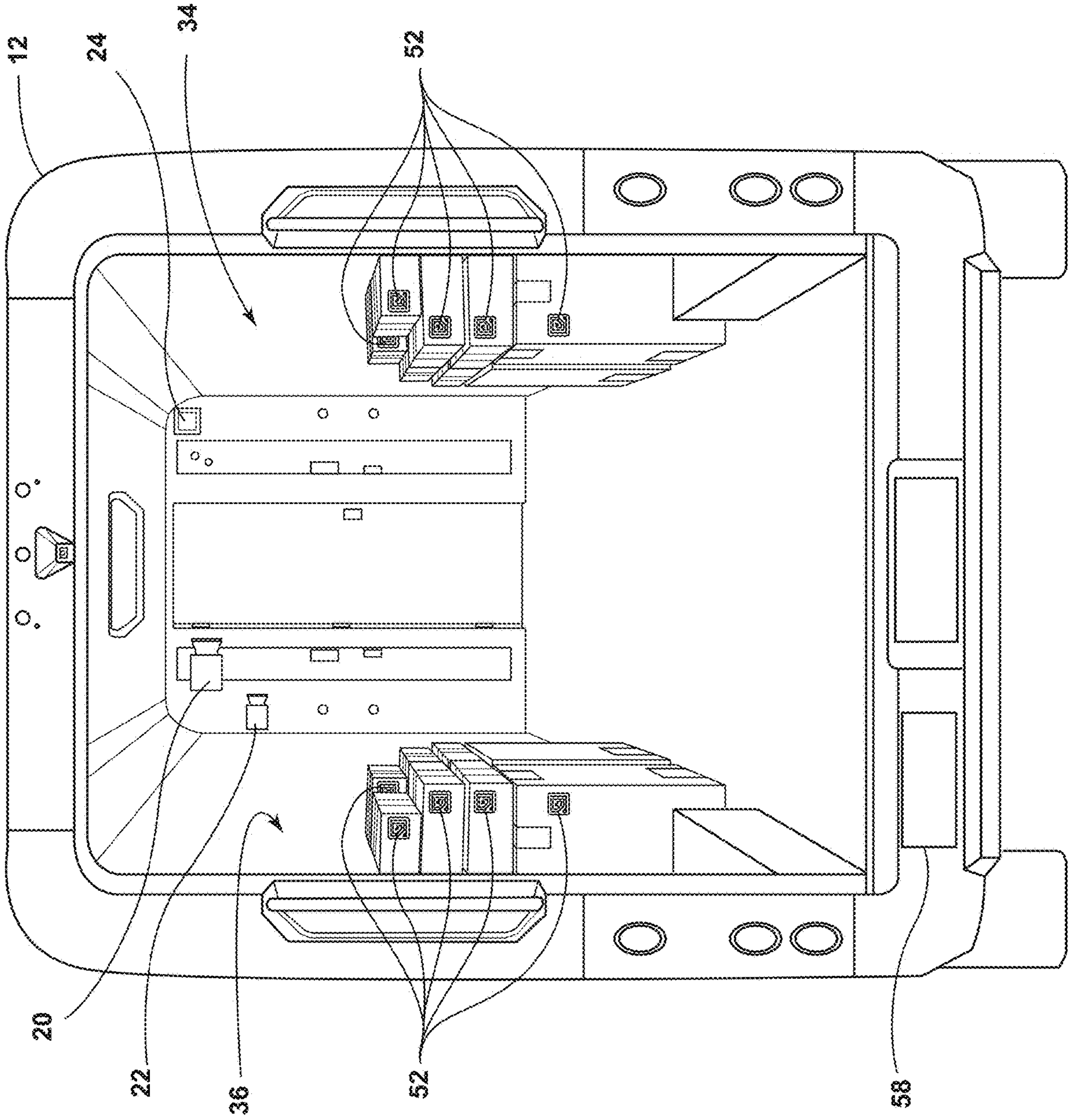
FIG. 2 illustrates a schematic view of a delivery vehicle with a plurality of cargo doors opened in accordance with one non-limiting aspect of the present disclosure.

FIG. 1 illustrates a schematic view of a multimodal freight monitoring and contextual notification system 10 in accordance with one non-limiting aspect of the present disclosure. The system 10 may be configured to generate monitoring data and contextual notifications for providing multimodal monitoring of a delivery vehicle 12. FIG. 2 illustrates a schematic view of the delivery vehicle 12 with a plurality of cargo doors 14 opened in accordance with one non-limiting aspect of the present disclosure. The monitoring system 10 may include a plurality of monitoring systems 20, 22, 24, 26, 28, 30 configured to generate monitoring data for freight 34 included within a cargo bay 36 accessible through the cargo doors 14. The monitoring systems 20, 22, 24, 26, 28, 30 may include capabilities for monitoring the freight 34 using differing modes for capturing the monitoring data so as to provide multimodal freight monitoring contemplated herein. The monitoring data, or at least portions thereof, may be used with a plurality of evaluation systems 40, 42, 44 to generate a plurality of evaluations of the freight 34. The monitoring data and/or the evaluations may be processed with a contextual notification controller 46 to facilitate generating a contextual notification for the freight 34, which may then be used to notify an operator 16, driver 16, or other individual(s) associated with the delivery vehicle 12 as to whether the freight 34 has been properly stacked, properly packaged, and/or shifted, leaned, or fallen during delivery.

The monitoring systems 20, 22, 24, 26, 28, 30 are shown for exemplary purposes to include a cargo camera system 20, a heatmap camera system 22, a radio frequency (RF) locating system 24, a road condition system 26, a route recommendation system 28, and a driver behavior system 30 for non-limiting purposes to demonstrate the capabilities of the present disclosure in providing multimodal monitoring of the freight 34. The multimodal monitoring, particularly the multiple types of monitoring data being generated by the monitoring systems 20, 22, 24, 26, 28, 30, may be beneficial in improving the detection and the monitoring of the freight 34 due to the attendant and the differentiated capabilities of the disparate monitoring systems 20, 22, 24, 26, 28, 30 to interpret, measure, and assess influences on the freight 34, both prior to and while being transported. The monitoring systems 20, 22, 24, 26, 28, 30 are shown to be separate and/or standalone items for exemplary and non-limiting purposes as the present disclosure fully contemplates the operations and capabilities associated therewith being integrated or otherwise combined, e.g., the cargo camera system 20 and the heatmap camera system may be one device, such as imaging device capable of visible light, night vision, and/or thermal camera, and/or additional devices may be employed, such as ultrasonic, radar and LiDAR systems.

The cargo camera system 20 may be configured to generate camera images, video, or other visual representations of the freight 34 while positioned within the cargo bay 36. The heatmap camera system 22 may be similarly configured to generate thermal, infrared (IR), radiation, electromagnetic energy, signals, and other nonvisible images of the freight 34 while positioned within the cargo bay 36. The RF locating system 24 may be operable in cooperation with RF tags 52 placed on the freight 34 such that signals may be exchanged therebetween to measure distances between the RF locating system 24 and the individual RF tags 52. The RF locating system may be a real-time locating systems (RTLS), which may include capabilities Bluetooth low energy (BLE), ultra-wide band (UWB), RF identification (RFID) and/or WiFi-based locating system. The road condition system 26 may be configured to identify road conditions for a route of the delivery vehicle 12, such as the physical structure of the road, e.g., curves, roughness, material, potholes, bumps, elevation changes, etc., optionally in a connected manner through vehicle-to-anything (V2X) such as vehicle-to-vehicle (V2V) and/or vehicle-to-infrastructure (V2I) communications. The route recommendation system 28 may be configured to select a route for the delivery vehicle 12, such as a plurality of directions needed to travel from an origination, e.g., the current location of the delivery vehicle 12, such as a loading location for the freight 34, to a destination. The route recommendation system 28 may cooperate with the road condition system 26 to select multiple routes or sets of directions for the delivery vehicle 12, which may be selected according to the fastest route, the route having the best road conditions or the road conditions least likely to disrupt the freight 34, etc. The driver behavior system 30 may be configured to monitor the driver 16, vehicle speeds, breaking events, etc. associated with assessing or generating a driving score representative of driver behavior, e.g., the driver behavior system 30 may be configured to assess an operator 16 of the delivery vehicle 12 while making multiple stops along a delivery route.

The cargo camera, the heatmap camera, and the RF locating systems 20, 22, 24 may be considered as direct, line-of-sight, or exchange type of monitoring systems, at least with respect to those monitoring systems 20, 22, 24 engaging or otherwise interfacing with the freight 34. The road condition, the route recommendation, and the driver behavior systems 26, 28, 30 may be considered as indirect type of monitoring systems, e.g., monitoring systems tasked with monitoring the delivery vehicle 12, driver 16, etc., optionally without directly monitoring the freight 34. The capability of the present disclosure to facilitate monitoring the freight 34 using multiple monitoring systems 20, 22, 24, 26, 28, 30 may be beneficial in generating different types of monitoring data, which in turn may be useful in providing different assessments of the freight 34 and/or behavior of the delivery vehicle 12. This multimodal monitoring data may be beneficially used in providing the improved freight monitoring and contextual notification contemplated herein. The illustrated monitoring systems 20, 22, 24, 26, 28, 30, however, are shown for non-limiting purposes as being at least partially onboard the delivery vehicle 12 as the present disclosure fully contemplates at least some of the monitoring systems 20, 22, 24, 26, 28, 30 being offboard the vehicle, such as at a back office of an original equipment manufacturer (OEM) of the delivery vehicle 12, at a headquarters or distribution center of a delivery company, or otherwise in communication with the delivery vehicle 12, such as with wireless signaling.

One non-limiting aspect of the present disclosure contemplates the evaluation systems 40, 42, 44 being configured to process the monitoring data purposes of making various assessments of the freight 34, the driver 16, the delivery vehicle 12, etc. The evaluation systems 40, 42, 44, for example, are shown to include a stacking evaluation system 40, a packaging evaluation system 42, and a movement evaluation system 44. The stacking evaluation system 40 may be configured to generate a stacking evaluation for the freight 34 as a function of the monitoring data, optionally with the stacking evaluation determining one of a proper stacking and an improper stacking depending on whether the freight 34 has been properly stacked. The packaging evaluation system 42 may be configured to generate a packaging evaluation for the freight 34 as a function of the monitoring data, optionally with the packaging evaluation determining one of a proper packaging and an improper packaging depending on whether the freight 34 has been properly packaged. The movement evaluation system 44 may be configured to generate a movement evaluation for the freight 34 as a function of the monitoring data, optionally with the movement evaluation determining one of an unmoved status and a moved status depending on whether the freight 34 has shifted, leaned, and/or fallen.

The contextual notification controller 46 may be configured to generate a contextual notification as a function of the stacking, packaging, and movement evaluations. The monitoring systems 20, 22, 24, 26, 28, 30 and evaluation systems 40, 42, 44 may be configured to continuously perform their monitoring and evaluation operations, such as to facilitate monitoring and evaluating the freight 34 as the freight 34 is being loaded into the cargo area and thereafter as the delivery vehicle 12 transports the freight 34. The freight 34 is shown in FIG. 2 as being comprised of a plurality of boxes 34 for exemplary and non-limiting purposes as the present disclosure fully contemplates the delivery vehicle 12 including other types of freight 34. FIG. 2 illustrates the freight 34, i.e., boxes 34, being properly stacked, properly packaged, and unmoved, which may respectively correspond with the stacking evaluation indicating the proper stacking, the packaging evaluation indicating the proper packaging, and the movement evaluation indicating the unmoved status. The contextual notification may be generated to apprise the operator 16 of the stacking, packaging, and movement evaluations, such as with a notification corresponding provided through a human-machine-interface (HMI) 58 of the delivery vehicle 12, which as shown in FIG. 1, may be provided proximate an exterior of the cargo doors 14 so as to provide the contextual notification to the operator 16 before the operator 16 opens the cargo doors 14. The HMI 58 may alternatively be included within a cab 60 of the delivery vehicle 12, such as through an infotainment system or dashboard and/or multiple HMIs 58 may be included, e.g., one HMI 58 may be included within the cab 60 and another in the illustrated manner proximate the cargo doors 14.

Figure 4:
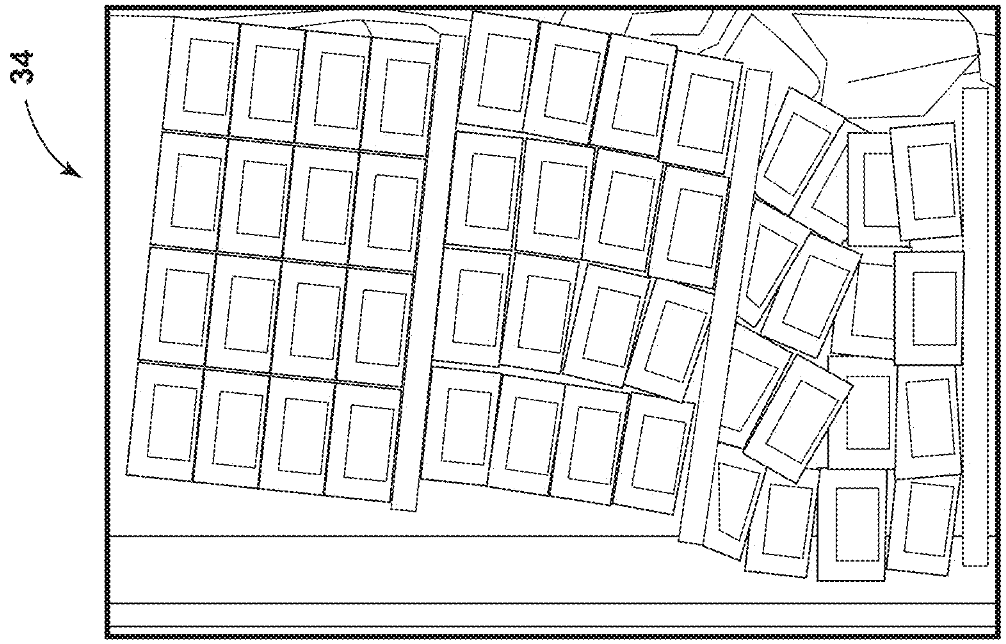
FIG. 4 illustrates a schematic view of freight being improperly stacked in accordance with one non-limiting aspect of the present disclosure.
Figure 3:
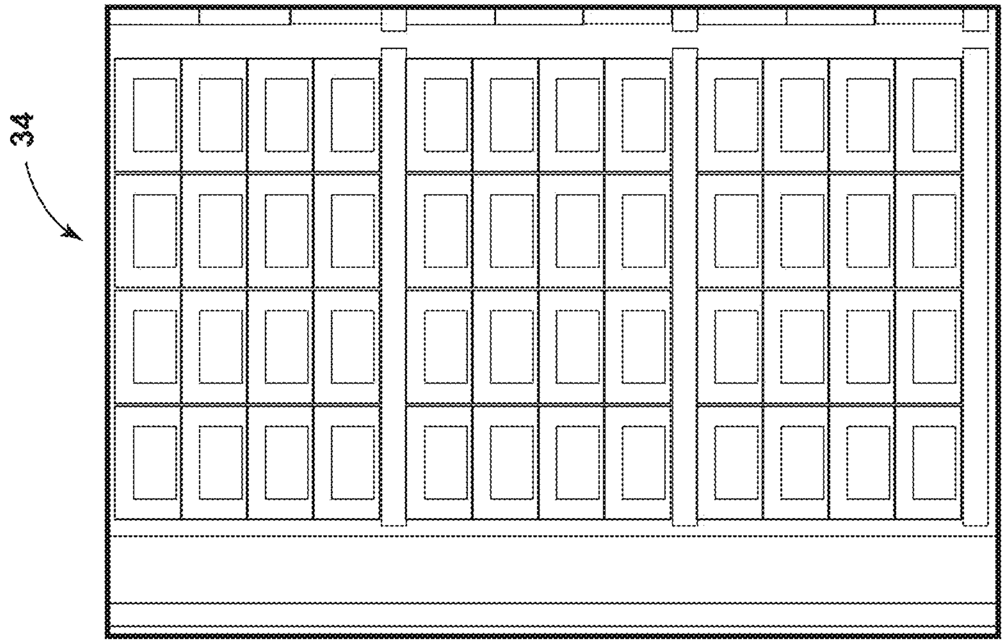
FIG. 3 illustrates a schematic view of freight being properly stacked in accordance with one non-limiting aspect of the present disclosure.

FIG. 3 illustrates a schematic view of the freight 34 being properly stacked in accordance with one non-limiting aspect of the present disclosure. FIG. 4 illustrates a schematic view of the freight 34 being improperly stacked in accordance with one non-limiting aspect of the present disclosure. The stacking evaluation system 40 may be configured to generate the stacking evaluation according to the camera images captured with the cargo camera system 20 whereby the camera images may be processed to determine whether the freight 34 is orientated or otherwise matching a baseline or desired stacking reference, e.g., the image shown in FIG. 3. The stacking evaluation may determine the proper stacking when the camera images are sufficiently aligned or matched with the baseline image (FIG. 3) and the improper stacking (FIG. 4) when the images are insufficiently aligned or matched. The stacking evaluation system 40 may optionally capture the camera images while the delivery vehicle 12 is stationary, e.g., while the delivery vehicle 12 is being loaded and/or while the delivery vehicle 12 is at a stop and the operator 16 is unloading one of the boxes. This may include the stacking evaluation system 40 being configured to determine vehicle speed and/or other characteristics of the delivery vehicle 12 from the monitoring data to ensure the compared camera images are taken while the delivery vehicle 12 is stationary as inconsistencies may occur should the comparison occur using camera images captured while the delivery vehicle 12 is moving.

Figure 5:
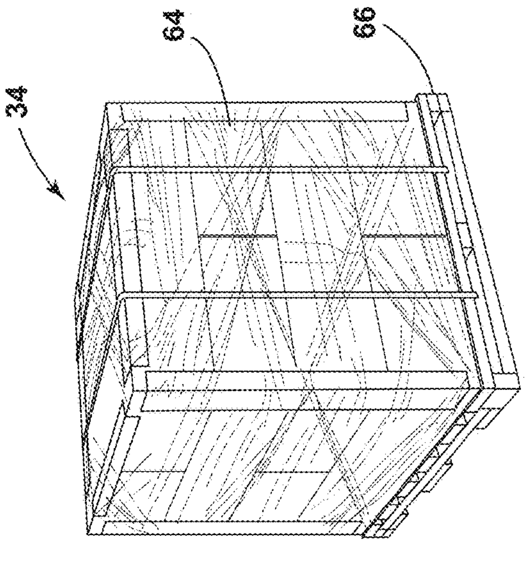
FIG. 5 illustrates a schematic view of freight being properly packaged in accordance with one non-limiting aspect of the present disclosure.
Figure 6:
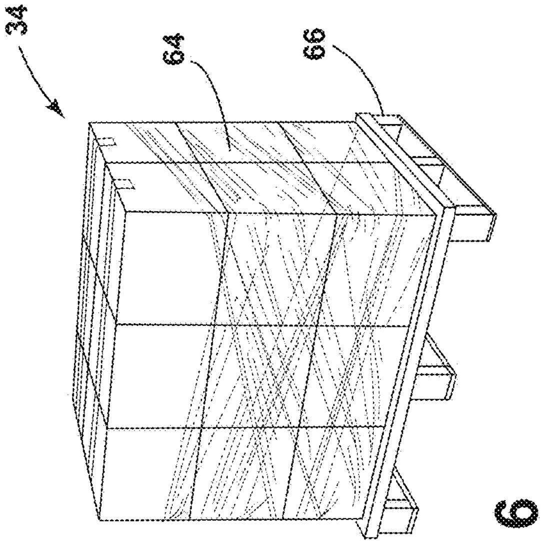
FIG. 6 illustrates a schematic view of freight being improperly packaged in accordance with one non-limiting aspect of the present disclosure.
Figure 7:
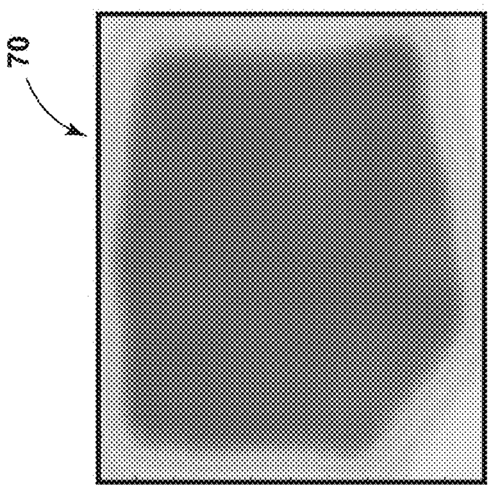
FIG. 7 illustrates a heatmap of freight being properly packaged in accordance with one non-limiting aspect of the present disclosure.
Figure 8:
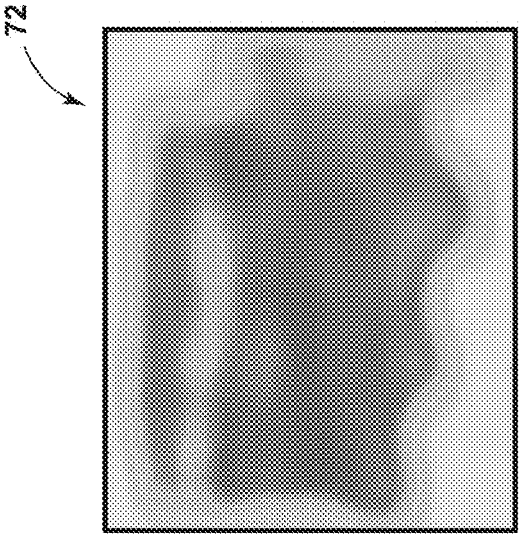
FIG. 8 illustrates a heatmap of freight being improperly packaged in accordance with one non-limiting aspect of the present disclosure.

FIG. 5 illustrates a schematic view of the freight 34 being properly packaged in accordance with one non-limiting aspect of the present disclosure. FIG. 6 illustrates a schematic view of the freight 34 being improperly packaged in accordance with one non-limiting aspect of the present disclosure. The packaging evaluation system 42 may be configured to generate the packaging evaluation according to whether a wrapping or other packaging 64 has been properly applied to secure the boxes 34 relative to each other and/or to a packaging pellet 66. The proper packaging determination may correspond with FIG. 5 where the wrapping material 64 is sufficiently wrapped around the boxes 34, whereas the improper packaging determination may correspond with FIG. 6 where the wrapping material 64 insufficiently surrounds the boxes 34. The packaging section system 42 may be configured to make the proper and improper packaging determinations based on heatmaps of the freight 34 captured with the heatmap camera system 22. FIG. 7 illustrates a heatmap 70 of the freight 34 being properly packaged in accordance with one non-limiting aspect of the present disclosure. FIG. 8 illustrates a heatmap 72 of the freight 34 being improperly packaged in accordance with one non-limiting aspect of the present disclosure. The packaging evaluation may determine the proper packaging when the heatmaps are sufficiently aligned or matched with the baseline image (FIG. 7) and the improper packaging (FIG. 8) when the heatmaps are insufficiently aligned or matched. The packaging detection system 40 may optionally capture the heatmaps while the delivery vehicle 12 is stationary. This may include the stacking evaluation system 42 being configured to determine vehicle speed and/or other characteristics of the delivery vehicle 12 from the monitoring data to ensure the compared heatmaps are taken while the delivery vehicle 12 is stationary. The proper packaging may also be determined using a classifier whereby heatmaps of proper packaging may be kept over time and/or used a model, i.e., baseline image reference, to detect dissimilarity to a normal or desired packaging.

Figure 9:
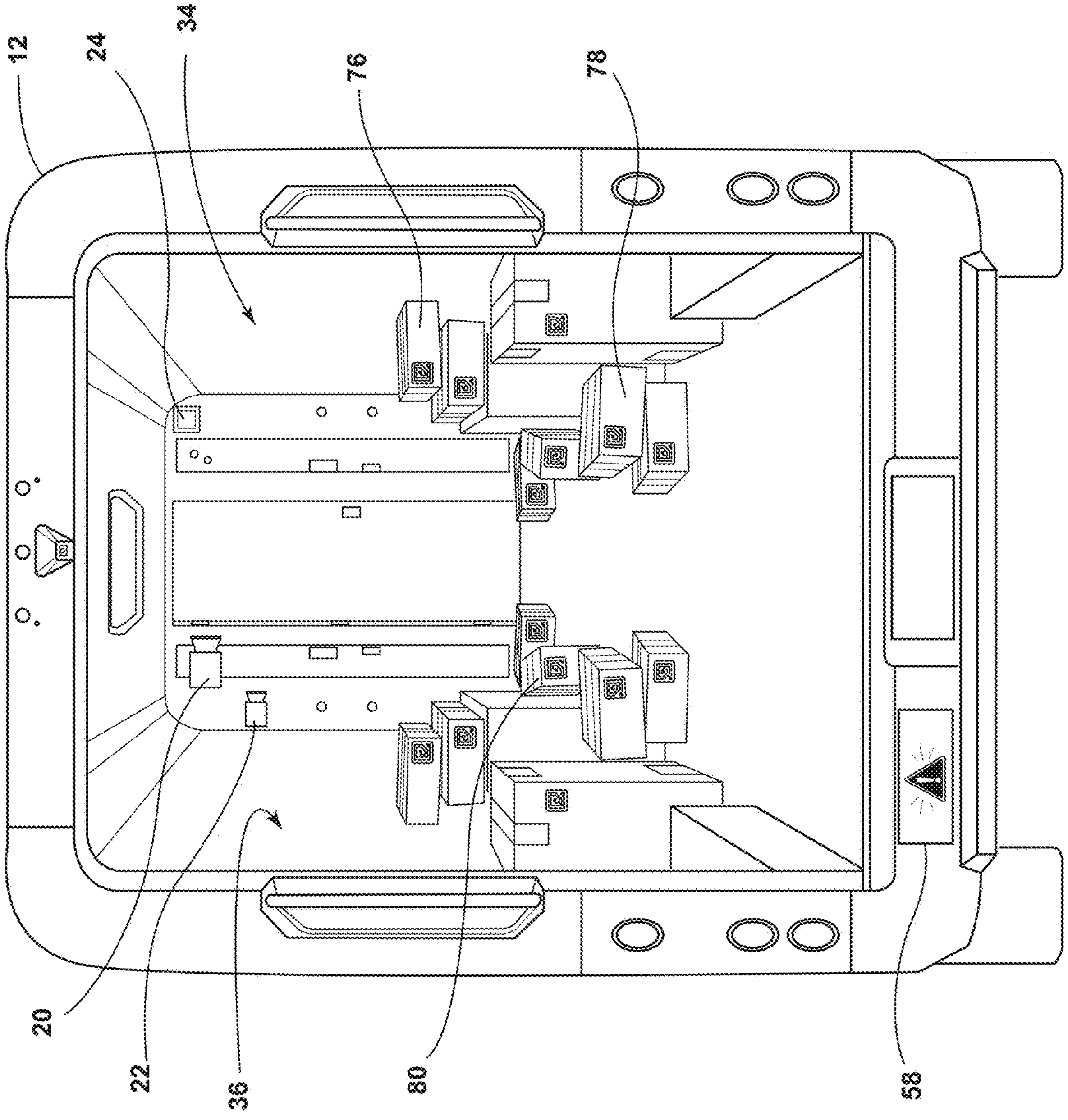
FIG. 9 illustrates a schematic view of freight being shifted, leaned, and fallen in accordance with one non-limiting aspect of the present disclosure.

FIG. 9 illustrates a schematic view of the freight 34 being shifted, leaned, and fallen in accordance with one non-limiting aspect of the present disclosure. The movement evaluation system 44 may be configured to generate the movement evaluation for assessing whether the freight 34 has shifted, leaned, and/or fallen while the delivery vehicle 12 is stationary/or while it is moving, i.e., in a continuous manner. Assuming, however, that the freight 34 has been properly loaded before transport, the movement assessment may be made while the delivery vehicle 12 is in transit or otherwise moving, i.e., at some point after the cargo doors 14 have been closed, and in some cases, sealed or otherwise locked. The movement evaluation assess whether any of the boxes 34 have moved during transport, which is shown for exemplary purposes to corresponding with an illustration of a shifted box 76, a leaned box 78, and a fallen box 80. The movement evaluation system may be configured to generate the movement evaluation according to the camera images captured with the cargo camera system 20 whereby the camera images may be processed to determine whether the freight 34 is orientated or otherwise matching a baseline or desired stacking reference, which may correspond with camera images of the loaded freight 34 taken prior to a departure, e.g., after properly loading the freight 34 in the manner shown in FIG. 2. The movement evaluation may determine the unmoved status when the camera images captured are sufficiently aligned or matched with the baseline image (FIG. 2) and the moved status (FIG. 8) when the images are insufficiently aligned or matched.

The contextual notification may include generating a notification for each of the determinations made with the stacking, packaging, and movement evaluations, which may be achieved by including a corresponding indicator, message, value, etc. within the HMI 58. The contextual notification may include generating the notification as a cargo confirmation in the absence of the evaluations determining one of the improper stacking, improper packaging, or moved status such that the cargo confirmation may indicate the proper packaging, the proper stacking, and the freight 34 being unmoved. The contextual notification may include generating the notification as a cargo warning in the event of any one of the evaluations determining one of the improper stacking, improper packaging, or moved status. The cargo warning, for example, may be used to warn the operator 16 to take action before a departure, such as by generating the cargo warning to indicate the improper stacking and/or the improper packaging. The cargo warning may also be used to warn the operator 16 to take precautions before opening the cargo doors 14, such as by generating the cargo warning to indicate the moved status, i.e., that the freight 34 has shifted, leaned, and or fallen at some point after the departure.

The capability of the present disclosure to provide multimodal freight 34 monitoring and contextual notification, prior to and after the delivery vehicle 12 has been loaded, may be beneficial in enabling determinations of the freight 34 to be used to mitigate a likelihood of the freight 34 being damaged in transport by the freight 34 shifting, leaning and/or falling while in route due to an ability of the system 10 to warn the operator 16 prior to departure of the freight 34 being improperly stacked and/or packaged. The described stacking and packaging evaluations may be automatically generated so to avoid the operator 16 from having to make the evaluations, which may be beneficial when the operator 16 lacks an ability to assess the freight 34, e.g., the operator 16 may lack the knowledge and/or may not have access to the freight 34, such as when the operator 16 is merely responsible for driving the delivery vehicle 12 after the freight 34 has been loaded and the cargo bay 36 thereafter sealed or locked. The described movement evaluation may also be automatically generated to assess whether the freight 34 has shifted, leaned, and/or fallen, typically during transport, which may be beneficial in providing the operator 16 with the context notification prior to having to open the cargo doors 14.

Figure 10:
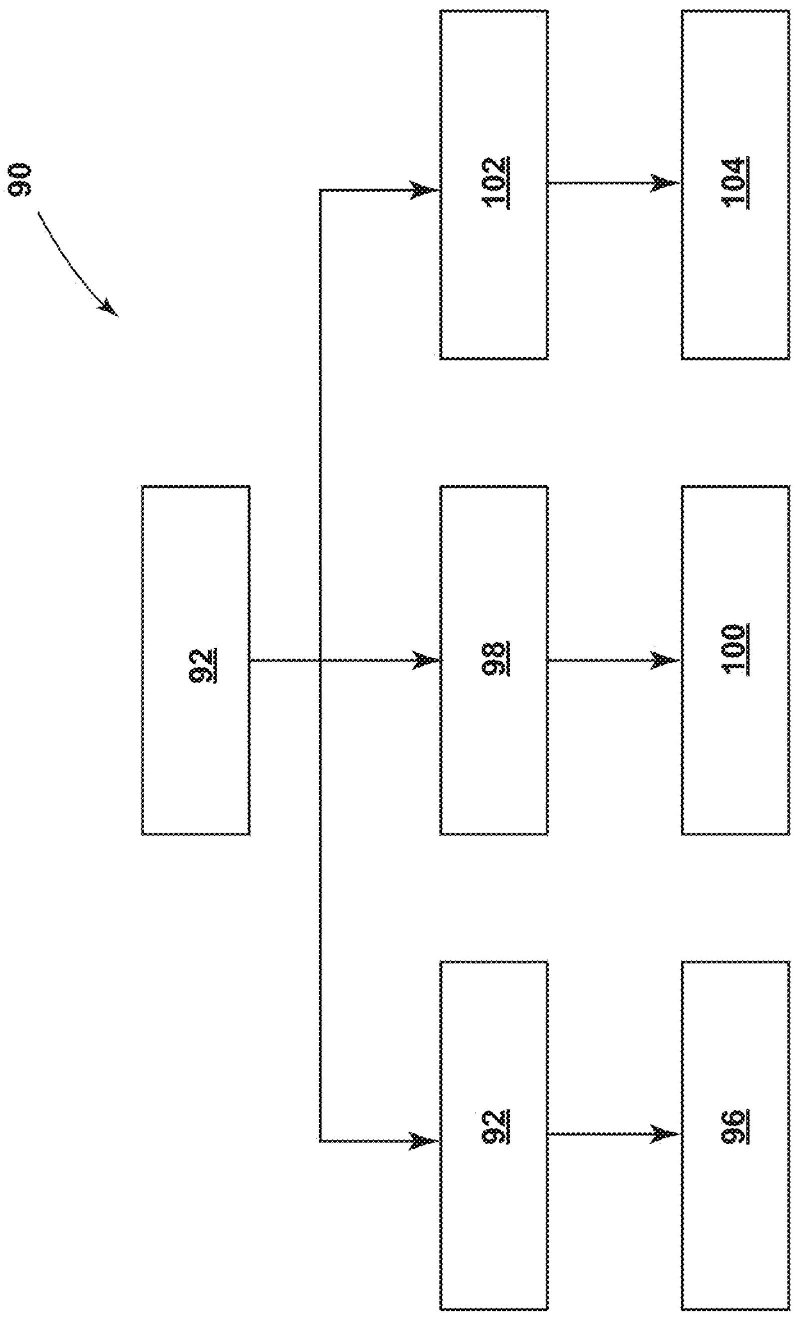
FIG. 10 illustrates a flowchart of a method for multimodal freight monitoring and contextual notification in accordance with one non-limiting aspect of the present disclosure.

FIG. 10 illustrates a flowchart 90 of a method for multi-modal freight 34 monitoring and contextual notification in accordance with one non-limiting aspect of the present disclosure. The method is predominantly set forth with respect to the above described system 10 for exemplary and non-limiting purposes as the present disclosure fully contemplates the method being similarly beneficial with other types of systems and configurations. The method may be facilitated with the above described constructs operating, processing, or otherwise enabling the actions contemplated herein according to an associated processor executing according to a plurality of non-transitory instructions stored on an associated computer readable medium. Block 92 relates to a monitoring process for collecting or otherwise generating the monitoring data described above, which may include continuously or repeatedly capturing heatmap and/or camera images, making RF measurements, collecting vehicle dynamics signals (e.g., speed, breaking, etc.), making route recommendations, collecting road condition information, assessing driver behavior, collecting location or global positioning system (GPS) information, and otherwise obtaining monitoring data useful in continuously monitoring the delivery vehicle 12 and/or freight 34, either directly and/or indirectly.

Block 94 relates to a stacking evaluation process whereby the stacking evaluation system may be used to generate the stacking evaluation for the freight 34, such as to determine whether the boxes have been properly stacked prior to departure, whereby the departure may correspond with the boxes being originally stacked at a onboarding location of the delivery vehicle 12 and/or after the delivery vehicle 12 has stopped along a route whereat the operator 16 removes one or more of the boxes for a delivery and thereafter restack the remaining boxes. The stacking evaluation may determine one of a proper stacking and an improper stacking for the freight 34 depending on whether the freight 34 has been properly stacked. This may include making a determination as to whether the freight 34 is loose or otherwise stacked such that the boxes may be individually move relative to each other or otherwise be positioned in a manner likely to result in the freight 34 shifting, leaning, or falling during transport. This determination may be made in the manner described above whereby camera images captured with the cargo camera of the freight 34 may be compared to baseline image reference (e.g., FIG. 3) previously stored and identified to correspond with proper stacking. In the event the delivery vehicle 12 is used to repeatedly transport the same freight 34, e.g., the same type of goods, multiple baseline camera images may be stored in memory or library book and thereafter used to facilitate the stacking evaluation process.)

Block 96 relates to a stacking notification process for generating a stacking notification as a contextual notification for the stacking evaluation process, which may occur concurrently and/or in parallel with the stacking evaluation process. The contextual notification controller 46 may be configured for generating the stacking notification as a corresponding message, indication, signal, etc. The stacking notification may be interfaced with the operator 16 through the HMI 58, optionally with a stacking confirmation being generated in the event of determining the proper stacking and a stacking warning being generated in the event of determining the improper stacking. The stacking confirmation may be generated as a green light or other message viewable through the HMI 58 to indicate the proper stacking, and the stacking warning may be generated as red light of other message viewable through the HMI 58 to indicate the improper stacking, which may include asking the driver 16 to restack the freight 34 properly. The stacking notification process may optionally include the controller 46 issuing instructions to a vehicle powertrain or other motive device used for driving the delivery vehicle 12 to prevent or otherwise control the delivery vehicle 12, such as to prevent driving of the delivery vehicle 12 or limiting the delivery vehicle 12 in another manner until the freight 34 is restacked, e.g., controlling a lock or otherwise preventing opening of the cargo doors 14.

Block 98 relates to a packaging evaluation process whereby the packaging evaluation system may be used to generate the packaging evaluation for the freight 34, such as to determine whether the boxes have been properly packaged or wrapped prior to departure. The packaging evaluation may determine one of a proper packaging and an improper packaging for the freight 34 depending on whether the freight 34 has been properly packaged, which may include making a determination as to whether the packaging is torn or otherwise disrupted in a manner likely to result in the freight 34 shifting, leaning, or falling during transport. This determination may be made in the manner described above whereby heatmaps captured with the heatmap camera of the freight 34 may be compared to a baseline image reference (e.g., FIG. 7) previously stored and identified to correspond with proper packaging. In the event the delivery vehicle 12 is used to repeatedly transport the same freight 34, e.g., the same type of goods, multiple baseline camera images may be stored in memory or library and thereafter used to facilitate the packaging evaluation process.

Block 100 relates to a packaging notification process for generating a packaging notification as a contextual notification for the packaging evaluation process, which may occur concurrently and/or in parallel with the stacking and packaging evaluation processes. The contextual notification controller 46 may be configured for generating the packaging notification as a corresponding message, indication, signal, etc. The packaging notification may be interfaced with the operator 16 through the HMI 58, optionally with a packaging confirmation being generated in the event of determining the proper packaging and a packaging warning being generated in the event of determining the improper packaging. The packaging confirmation may be generated as a green light or other message viewable through the HMI 58 to indicate the proper packaging, and the packaging warning may be generated as red light of other message viewable through the HMI 58 to indicate the improper packaging, which may include asking the driver 16 to repackage the freight 34 properly. The packaging notification process may optionally include the controller 46 issuing instructions to a vehicle powertrain to prevent or otherwise control the delivery vehicle 12, such as to prevent driving of the delivery vehicle 12 or limiting the delivery vehicle 12 in another manner until the freight 34 is repackaged, e.g., controlling a lock or otherwise preventing opening of the cargo doors 14.

Block 102 relates to a movement evaluation process whereby the movement evaluation system may be used to generate the movement evaluation for the freight 34, such as to determine whether the boxes have shifted, leaned, and/or falling. The movement evaluation may determine one of an unmoved status and a moved status for the freight 34 depending on whether the freight 34 has moved, which may as a result of the freight 34 being improperly secured or tied down, improper stacking and/or packaging, or other influences, e.g., driver behavior or road conditions may cause the freight 34 shifting, leaning, or falling during transport. This determination may be made in the manner described above whereby camera images captured with the cargo camera of the freight 34 may be compared to a baseline image reference (e.g., FIG. 2) previously stored and identified to correspond with proper movement. In the event the delivery vehicle 12 makes multiple stops while delivering the freight 34, the baseline image reference may be correspondingly updated prior to each departure, i.e., each update of the baseline image reference may be updated to account for one or more of the boxes being removed for delivery.

The movement evaluation process may optionally include generating the movement evaluation as function of road conditions included as at least part of the monitoring data. The road conditions may be generated with the road condition system and analyzed, such as over a route being traveled by the delivery vehicle 12, to assess whether the road conditions may be severe enough to have caused the freight 34 to shift, lean, and/or fall while being transported, such as by generating a road disruption score bye on vehicle flow, travel speed, pedal usage, G-force, hard braking and acceleration, lane changes, etc. A calibratable road condition threshold may be compared to the road conditions, and optionally the road disruption scored, traversed by the delivery vehicle 12 to determine whether the road conditions are sufficiently severe to warrant the moved status, e.g., the moved status may be determined even if the camera images failed to do so, which may be beneficial in providing a notification to the operator 16 prior to operating the cargo doors 14 after traveling over road surfaces having a higher than desired likelihood of freight 34 movement.

The movement evaluation process may optionally include generating the movement evaluation as function of RF measurements included as at least part of the monitoring data. The RF measurements may be generated with the RF locating system included as at least part of the monitor systems and analyzed, such as over a route being traveled by the delivery vehicle 12, to assess whether the RF measured distances between the RF tags 52 in the locating system have changed enough to have caused the freight 34 to shift, lean, and/or fall while being transported. A calibratable RF threshold may be compared to the RF measurements to determine whether the road conditions are sufficiently severe to warrant the moved status, e.g., the moved status may be determined even if the camera images or the road conditions failed to do so, which may be beneficial in providing a notification to the operator 16 prior to operating the cargo doors 14 if the RF measures indicate a higher than desired likelihood of freight 34 movement.

The movement evaluation process may optionally include generating the movement evaluation as function of a driving score included as at least part of the monitoring data. The driving score may be generated with the driver behavior system and analyzed, such as over a route being traveled by the delivery vehicle 12, to assess whether the driving behavior or score may be severe enough to have caused the freight 34 to shift, lean, and/or fall while being transported. A calibratable driving threshold may be compared to the driving score to determine whether the driver 16 may have operated the delivery vehicle 12 in a manner severe enough to warrant the moved status, e.g., the moved status may be determined even if the camera images, the road conditions, and the RF measurements failed to do so, which may be beneficial in providing a notification to the operator 16 prior to operating the cargo doors 14 after operating the delivery vehicle 12 in such a way to induce a higher than desired likelihood of freight 34 movement.

Block 104 relates to a movement notification process for generating a movement notification as a contextual notification for the movement evaluation process. The contextual notification controller 46 may be configured for generating the movement notification as a corresponding message, indication, signal, etc. The movement notification may be interfaced with the operator 16 through the HMI 58, optionally with a movement confirmation being generated in the event of determining the unmoved status and a movement warning being generated in the event of determining the moved status. The movement confirmation may be generated as a green light or other message viewable through the HMI 58 to indicate the unmoved status, and the movement warning may be generated as red light of other message viewable through the HMI 58 to indicate the moved status, which may include asking the driver 16 to repackage the freight 34 properly. The movement notification process may optionally include the controller 46 issuing instructions to the delivery vehicle 12 powertrain to prevent or otherwise control the delivery vehicle 12, such as to prevent driving of the delivery vehicle 12, limiting the delivery vehicle 12 in another manner until the freight 34 is repackaged or the warning is acknowledged by the operator 16, e.g., controlling a lock or otherwise preventing opening of the cargo doors 14 until the drive inputs an acknowledgement to the HMI 58 and/or directing the driver 16 to a new route, e.g., guiding the operator 16 to a destination with alternative directions differing from original directions specified in an original route to the destination.

As supported above, various aspects of the present disclosure relate to methods and systems for auto-detection of improper stacking, pallet wrap or packaging issues, and shifted, leaned, or fallen freight 34 in delivery trucks and contextual notification of a driver 16 or other operator 16. With input from cargo-interior camera being combined with vehicle dynamics signals and delivery routine information, a real-time freight 34 monitoring and timely reporting of shifted, leaned, or fallen freight 34 may be recognized based on continuous monitoring of the package distribution and estimating a height map of truck bed with a camera and based thereon reporting unsecure package motion by comparing the difference between camera frames. The use of cargo-interior camera, vehicle dynamic signal, and GPS geocode are contemplated for use in memorizing a reference camera frame taken at the most recent moment vehicle parked before driving (e.g., the moments finish loading or finish a drop-off) for comparison to scene changes within a live camera frame taken while the delivery vehicle 12 is moving. A one or more detected scene changes may be compared to a calibratable threshold, with a report of unsecure package motion being generated when the threshold is exceeded. A pallet wrap failure detection capability may be based on extracting patches texture distribution to train a one-class classifier to model a properly wrapped cases, which may then be used to detect the dissimilarity to ‘normal’ case and report tear wrap accordingly if detected. RF tags 52 may be used to continuously measure a relative distance between the freight and the location reader with an alert being generated if the distance exceeds a certain calibratable threshold. The use of near-real time retail vehicle telemetry data on nearby roads may be employed to estimate road disruption score based on extracted features, e.g., vehicle flow and travel speed, drive pedal usage, drive G-force, hard braking and acceleration, and number of lane changes to estimate the road disruption score. Road condition information, e.g., location and severity of potholes detected by retail vehicles and road segment roughness measured by retail vehicles, may be used to recommend a driving route, such as by optimizing a route according to a predicted disturbance to the cargo. A contextual notification may be generated to warn the driver 16 about the status of the freight.

The terms “comprising”, “including”, and “having” are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term “or” includes any one and all combinations of the associated listed items. The term “any of” is understood to include any possible combination of referenced items, including “any one of” the referenced items. “A”, “an”, “the”, “at least one”, and “one or more” are used interchangeably to indicate that at least one of the items is present. A plurality of such items may be present unless the context clearly indicates otherwise. All numerical values of parameters (e.g., of quantities or conditions), unless otherwise indicated expressly or clearly in view of the context, including the appended claims, are to be understood as being modified in all instances by the term “about” whether or not “about” actually appears before the numerical value. A component that is “configured to” perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims. Although several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A multimodal freight monitoring and contextual notification system for a delivery vehicle, comprising:

one or more monitoring systems configured to generate monitoring data for multimodal monitoring of freight included within a cargo bay of the delivery vehicle;

a stacking evaluation system configured to generate a stacking evaluation for the freight as a function of the monitoring data, the stacking evaluation determining one of a proper stacking and an improper stacking depending on whether the freight has been properly stacked;

a packaging evaluation system configured to generate a packaging evaluation for the freight as a function of the monitoring data, the packaging evaluation system performs:

training of a one-class classifier to model a plurality of properly wrapped cases; and determining one of a proper packaging and an improper packaging depending on whether the freight has been properly packaged per the plurality of properly wrapped cases of the model;

a movement evaluation system configured to generate a movement evaluation for the freight as a function of the monitoring data, the movement evaluation determining one of an unmoved status and a moved status depending on whether the freight has shifted, leaned, and/or fallen;

a contextual notification controller configured to generate a contextual notification as a function of the stacking, packaging, and movement evaluations, the contextual notification including a cargo warning for an operator of the delivery vehicle in response to the stacking, packaging, and movement evaluations determining the improper packaging and the moved status; and a human-machine-interface (HMI) configured to interface the contextual notification with the operator.

2. The multimodal freight monitoring and contextual notification system of claim 1, wherein the cargo warning instructs the operator to restack the freight in response to the improper stacking being determined.

3. The multimodal freight monitoring and contextual notification system of claim 1, wherein the cargo warning instructs the operator to repackage the freight in response to the improper packaging being determined.

4. The multimodal freight monitoring and contextual notification system of claim 1, wherein the cargo warning instructs the operator to move the freight back to a loaded position in response to the moved status being determined, the loaded position corresponding with positioning of the freight prior to the shifting, the leaning, or the falling.

5. The multimodal freight monitoring and contextual notification system of claim 1, wherein the cargo warning instructs the operator to be careful when opening a cargo door of the delivery vehicle in response to the moved status being determined.

6. The multimodal freight monitoring and contextual notification system of claim 1, wherein the cargo warning instructs the operator to drive carefully in response to the moved status being determined.

7. The multimodal freight monitoring and contextual notification system of claim 1, wherein the contextual notification instructs the operator to an alternative route in response to the moved status being determined, the alternative route guiding the operator to a destination with alternative directions differing from original directions specified in an original route to the destination.

8. The multimodal freight monitoring and contextual notification system of claim 1, wherein the stacking evaluation system is configured to generate the stacking evaluation as function of camera images included as at least part of the monitoring data, the camera images being generated with an image camera included as at least part of the monitor systems, the image camera being disposed within the cargo bay in line-of-sight of the freight.

9. The multimodal freight monitoring and contextual notification system of claim 1, wherein the packaging evaluation system is configured to generate the packaging evaluation as function of heatmaps included as at least part of the monitoring data, the heatmaps being generated with a heatmap camera included as at least part of the monitor systems, the heatmap camera being disposed within the cargo bay in line-of-sight of the freight.

10. The multimodal freight monitoring and contextual notification system of claim 1, wherein the movement evaluation system is configured to generate the movement evaluation as function of camera images included as at least part of the monitoring data, the camera images being generated with an image camera included as at least part of the monitor systems, the image camera being disposed within the cargo bay in line-of-sight of the freight.

11. The multimodal freight monitoring and contextual notification system of claim 1, wherein the movement evaluation system is configured to generate the movement evaluation as function of road conditions included as at least part of the monitoring data, the road conditions being generated with a road condition system included as at least part of the monitor systems.

12. The multimodal freight monitoring and contextual notification system of claim 1, wherein the movement evaluation system is configured to generate the movement evaluation as function of radio frequency (RF) measurements included as at least part of the monitoring data, the RF measurements being generated with an RF locating system included as at least part of the monitor systems.

13. The multimodal freight monitoring and contextual notification system of claim 1, wherein the movement evaluation system is configured to generate the movement evaluation as function of a driving score included as at least part of the monitoring data, the driving score being generated with a driver behavior system included as at least part of the monitor systems.

14. The multimodal freight monitoring and contextual notification system of claim 1, wherein the HMI is configured to prevent opening of a cargo door of the delivery vehicle until the operator inputs an acknowledgment of the cargo warning to the HMI.

15. A multimodal freight monitoring and contextual notification system for a delivery vehicle, comprising:

one or more monitoring systems configured to generate monitoring data for multimodal monitoring of freight included within a cargo bay of the delivery vehicle;

a road condition system configured to identify a plurality of road conditions of a route of the delivery vehicle as a function of the monitoring data, wherein the plurality of road conditions include a physical structure of a road along the route, a plurality of curves, a roughness, a plurality of bumps and a plurality of elevation changes;

a movement evaluation system configured to generate a movement evaluation for the freight as a function of the monitoring data and the plurality of road conditions, the movement evaluation determining one of an unmoved status and a moved status depending on whether the freight has shifted, leaned, and/or fallen;

a packaging evaluation system configured to generate a packaging evaluation for the freight as a function of the monitoring data, the packaging evaluation system performs:

training of a one-class classifier to model a plurality of properly wrapped cases of the model; and determining one of a proper packaging and an improper packaging depending on whether the freight has been properly packaged per the plurality of properly wrapped cases;

a contextual notification controller configured to generate a contextual notification indicating the unmoved status and the moved status and the packaging evaluation; and a human-machine-interface (HMI) on an exterior of the delivery vehicle proximate a cargo door to the cargo bay and configured to interface the contextual notification with an operator of the delivery vehicle.

16. The multimodal freight monitoring and contextual notification system of claim 15, wherein the contextual notification instructs the operator to an alternative route in response to the moved status being determined, the alternative route guiding the operator to a destination with alternative directions differing from original directions specified in an original route to the destination.

17. The multimodal freight monitoring and contextual notification system of claim 15, wherein the contextual notification controller is configured in response to an improper stacking and/or the improper packaging for the freight to prevent a departure of the delivery vehicle.

18. The multimodal freight monitoring and contextual notification system of claim 17, wherein the contextual notification controller is configured in response to the moved status to prevent opening of an exterior cargo door after the departure until the operator inputs an acknowledgement of the contextual notification to a human-machine-interface (HMI) of the delivery vehicle.

19. The multimodal freight monitoring and contextual notification system of claim 15, wherein the contextual notification including a cargo warning for an operator of the delivery vehicle.

20. The multimodal freight monitoring and contextual notification system of claim 19, wherein the cargo warning instructs the operator to restack the freight in response to an improper stacking being determined.

* * * * *